United States Patent [19]

Moore et al.

[11] Patent Number: 4,682,847

[45] Date of Patent: Jul. 28, 1987

[54] CONNECTOR FOR RELEASABLE CONNECTION OF A FIRST AND A SECOND APPARATUS

[75] Inventors: Robert H. Moore, Mickleover; Paul Morgan, Duffield, both of United Kingdom

[73] Assignee: John Davis & Son (Derby) Limited, Derby, United Kingdom

[21] Appl. No.: 669,239

[22] Filed: Nov. 7, 1984

[30] Foreign Application Priority Data

Nov. 8, 1983 [GB] United Kingdom ................ 8329734

[51] Int. Cl.[4] ........................... G02B 6/36; G02B 7/26

[52] U.S. Cl. .............................. 350/96.20; 350/96.21; 350/96.22

[58] Field of Search ............... 350/96.20, 96.21, 96.22; 403/330; 24/170, 179, 191; 339/91 R, 243

[56] References Cited

U.S. PATENT DOCUMENTS 3,187,398 6/1965 Sommer .............................. 24/191
3,610,092 10/1971 Miller ................................ 403/330
3,805,988 4/1974 Walker et al. ........................ 24/170
4,033,010 7/1977 McCalla ............................. 403/330
4,076,361 2/1978 Campbell ......................... 339/91 R
4,083,619 4/1978 McCormick et al. ............ 339/91 R
4,168,877 9/1979 Little et al. ...................... 339/91 R
4,220,094 9/1980 Nielsen ............................... 403/330
4,367,003 1/1983 Frantz .............................. 339/91 R

*Primary Examiner*—Robert E. Wise
*Attorney, Agent, or Firm*—Christie, Parker & Hale

[57] ABSTRACT

For releasable connection of a first apparatus (e.g. an electric cable) to a second apparatus (e.g. an electric switch) for conductive communication therebetween, a connector comprises a plug (1), a socket (2), an over-center buckle (14–17) and an "O"-ring (19), the latter being housed in said socket (2) and arranged to be compressed in the course of, the engagement of said plug and socket as effected by displacement of said buckle. The "O" ring upon compression tends to resile in a sense to displace the buckle towards its engaged state. This provides both the requisite locking between the plug and the socket, and also a seal against the ingress of moisture into the socket. Interengaging contacts (7,11) are each carried on a non-conductive carrier member (23,27), the carrier members having resilient tongues and lips (24,25,28,29) for retention in the plug and socket respectively by snap action over a step (26,30) within body portions (9,12) of the plug and socket respectively.

8 Claims, 4 Drawing Figures

CONNECTOR FOR RELEASABLE CONNECTION OF A FIRST AND A SECOND APPARATUS

BACKGROUND OF THE INVENTION

1. Field of the Invention

This invention relates to a connector (hereinafter referred to as "a connector of the kind hereinbefore defined") for releasable connection of a first apparatus to a second apparatus, the connector comprising a first and a second part, said parts being adapted for slidable interengagement along an axis common to said parts and for securing thereto said first and second apparatus respectively for conductive communication between said first and second apparatus.

Herein and in the claims, the term "apparatus" means any appliance, device, equipment or other article which is required to perform a given operation entailing conductive communication with other such apparatus; without prejudice to the generality of the term, it includes electrical and optical conductors, such as cables and optical fibres for conducting respectively energy in the form of electricity and light. The term "conductive communication" is to be construed accordingly.

2. Description of the Prior Art

Connectors of the kind hereinbefore defined are in common use, the said parts of such connectors being adapted to be held together by a variety of means. In one form of such connector, the said parts are secured together by bolts. Securing such connectors is inconvenient firstly because the bolts are liable to be lost (possibly dropped in an inaccessible place) and secondly because the bolts may have to be tightened up in a relatively inaccessible position on site.

In another known form of such connector, provision is made on the said parts for them to be screwed together by means of screw threads on their outer surfaces; such connectors are relatively expensive, susceptible to binding in a dirty environment and lacking in tactile feedback indicating whether or not fully engaged.

British Patent Specification No. 658,628 also describes a connector including a plug and socket in which the plug is provided with a hooked member which is arranged to engage a lug on the socket. A handle pivotally supports the hooked member and is operable to cause the hooked member when engaging the lug to draw the plug and socket together. The handle is then held in place by clipping it on to the socket and a spring is provided to hold the hooked member in engagement with the lug.

The disadvantage of this arrangement is that the arrangement is complex and if excessive force is applied between the socket and plug to pull them apart the hooked member and handle with both allow the two parts to be released.

It is an aim of the present invention to provide an improved connector of the kind hereinbefore defined, in which the disadvantages (e.g. those hereinbefore mentioned), of such connectors as are presently in use or have heretofore been proposed, are substantially reduced or eliminated.

SUMMARY OF THE INVENTION

According to one aspect of the invention there is provided a connector for releasably connecting a first apparatus to a second apparatus, the connector comprising first and second parts, said parts being arranged for slidable interengagement along a common axis, separate resilient means located between the first and second parts acting in a sense to urge the parts apart, engagement means on the second part; a handle pivotally supported on the first part for pivotal movement about a second axis extending generally perpendicular to the common axis; a stirrup member pivotally supported on the handle for pivotal movement about a third axis lying spaced from but extending generally parallel to the second axis, said stirrup means being arranged to engage the engagement means, the second and third axes being so relatively positioned that when said stirrup member is in engagement with the engagement means, progressive pivotal movement of said handle in a first sense will initially draw said two parts together and then allow limited movement of said parts apart under the force of the resilient means whereby said resilient means will urge said handle in said first sense.

A particular application of such connectors is the interconnection of a plurality of electrical appliances, e.g. switches, by means of cables comprising a plurality of electrical conductors.

Hence, although as hereinbefore stated, the scope of the present invention also includes the application of such connectors to the interconnection of other forms of apparatus, e.g. by means of at least one optical fibre, the connector which will now be described, by way of example only, with reference to the accompanying drawings, is a connector which has been specifically designed for connecting a said first apparatus in the form of an electrical switch to a said second apparatus in the form of an electrical cable having a plurality of conductors or cores.

BRIEF DESCRIPTION OF THE DRAWINGS

In the drawings, which show a said connector embodying the invention.

DESCRIPTION OF THE PREFERRED EMBODIMENT

Figure 1:
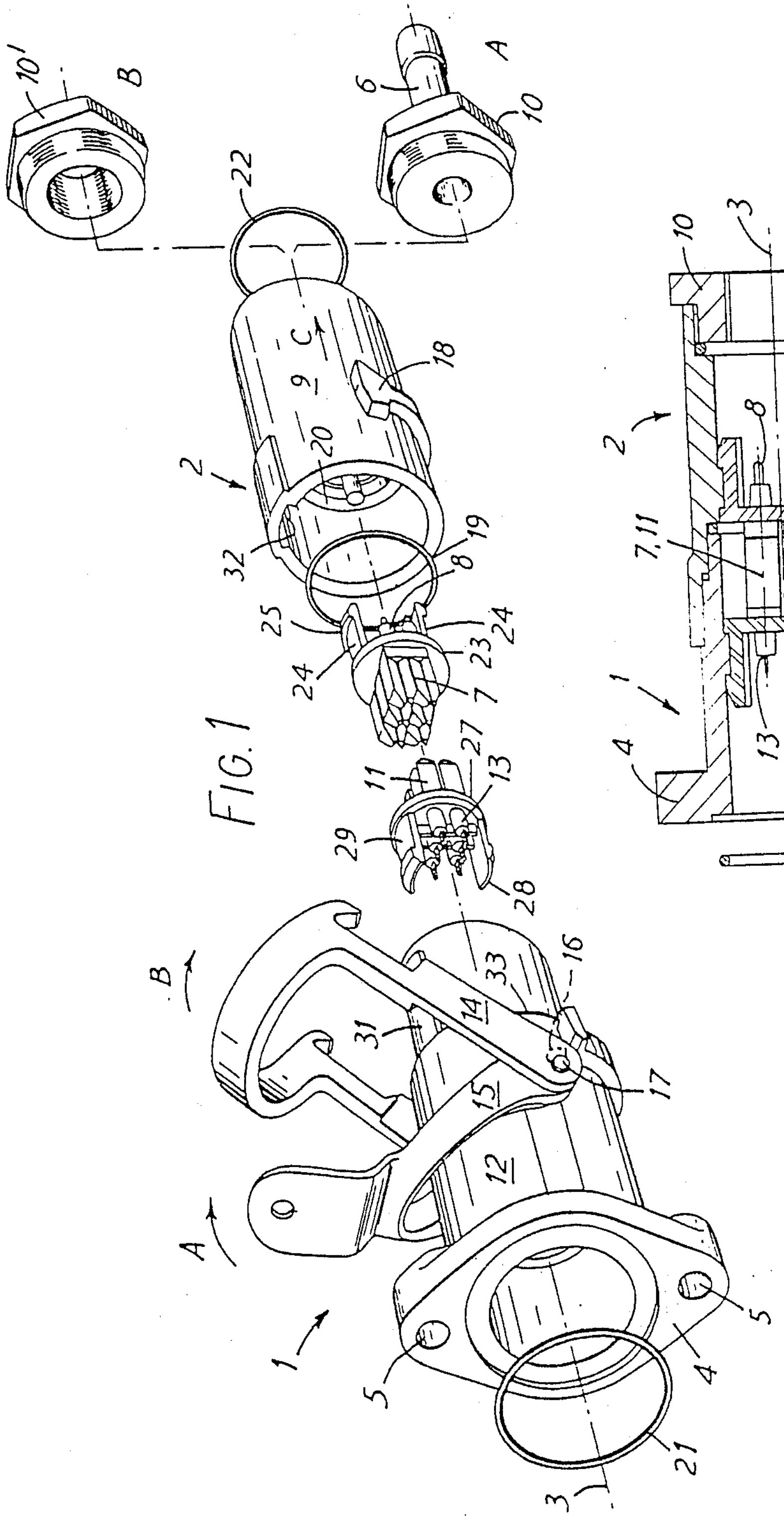
FIG. 1 is an exploded perspective view of the connector, showing two alternative adapters (A) and (B) for connecting a said second apparatus to a said first apparatus.
Figure 2:
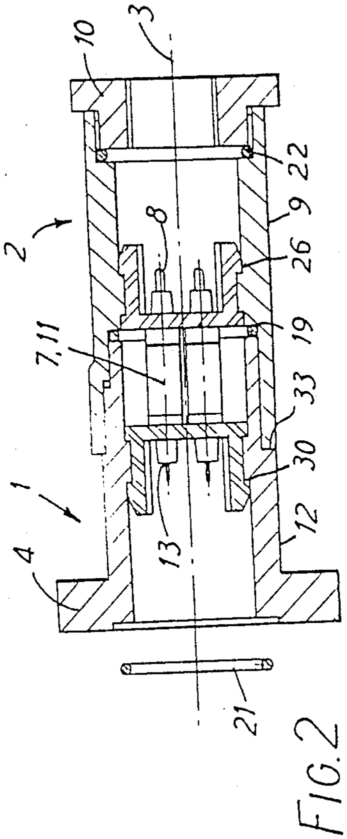
FIG. 2 is a longitudinal sectional view of the connector with the over-centre buckle and its associated pivot omitted.

Referring to the drawings, the connector for releasable connection of a first apparatus in the form of an electrical switch (not shown) to a second apparatus in the form of a cable (not shown) comprises a first part in the form of a plug 1 and a second part in the form of a socket 2. The plug 1 and socket 2 are adapted for slidable interengagement along their common axis 3.

The plug 1 is adapted to be secured to the switch by means of a flange 4 using two or more studs, screws or bolts (not shown), which extend through a corresponding number of holes in the flange 4, such as the holes 5 shown, to nuts (not shown) or into threaded holes in the wall of the switch.

The cable, if in the form of cores within a flexible armoured cable conduit (possibly similar to "hydraulic hose"), is attached by means of a nut 10 and sleeve 6 (FIG. 1(A)), the conduit being secured over the sleeve 6 and the cores passing through the latter for connection to contacts 7 via terminals 8 housed within the socket 2. Alternatively, (viz. for connecting a conventional form of cable), the sleeve 6 may be omitted and a conventional cable gland 10′ provided (FIG. 1(B)).

Contacts 11, adapted to mate with the contacts 7 of the socket 2, are provided within a body portion 12 of the plug 1, the switch being connected in known manner to terminals 13 (similar to the terminals 8) of the contacts 11.

When the plug 1 is interengaged with the socket 2, conductive communication between the switch and the cable is established via, i.e. by interengagement of, the contacts 7,11.

The plug 1 has an over-centre buckle comprising a stirrup member 14 and a manually operable handle 15. The latter is arranged to swing about pivots 16 extending diametrically from the body portion 12, whilst the stirrup member 14 is arranged to swing about pivots 17 extending diametrically from the handle 15, the pivots 17 being located displaced with respect to the pivots 16.

The stirrup member 14 is adapted to engage, in a manner hereinafter to be described, a pair of lugs 18 extending diametrically from the body portion 9 of the socket 2.

Resilient means in the form of an "O"-ring 19 which is housed in the body portion 9 of the socket 2, are arranged, as will be hereinafter described, to be compressed in the course of, and to remain compressed during, the engagement of the stirrup member 14 with the lugs 18 (during which engagement the plug 1 is in conductive communication with the socket 2 via their respective contacts 7,11), the "O"-ring 19 being decompressed and reasserting itself when the plug 1 is disengaged from the socket 2.

The body portion 9 of the socket 2 has an internal annular seat 20 for the "O"-ring 19.

Further "O"-rings 21 and 22 are provided for respectively providing waterproof seals between the flange 4 and the switch, and between the nut 10 (or cable gland 10′) and the body portion 9 of the socket 2.

The contacts 7 and terminals 8 are secured to a carrier member 23 which is made of a suitable, electrically insulating, plastics material, e.g. PTFE. It has a pair of diametrically opposed tongues 24, which are resilient and each of which is provided with a lip 25; the latter are tapered and so arranged that, when the carrier member 23 is inserted into the body portion 9 of the socket 2 coaxially therewith, the lips 25 retain the carrier member 23 in the body portion 9 behind an annular step 26 in the latter, following resilient diametrically inward deformation of the tongues 24 and their resilient diametrically outward re-assertion when the carrier member 23 has reached its final position, by way of a snap action.

A carrier member 27, identical with the carrier member 23, is provided for the contacts 11 and terminals 13, and lips 28 on its tongues 29 hold the carrier member 27 in position within the body portion 12 of the plug 1 behind a step 30 in the latter, in exactly the same way as that in which the carrier member 23 is held in position in the body portion 9 of the socket 2.

For the purpose of polarising the plug 1 with respect to the socket 2 (i.e. for the purpose of ensuring correct angular alignment therebetween), the plug 1 is provided with a feather 31, arranged to engage in a keyway 32 within the socket 2.

Figure 3:
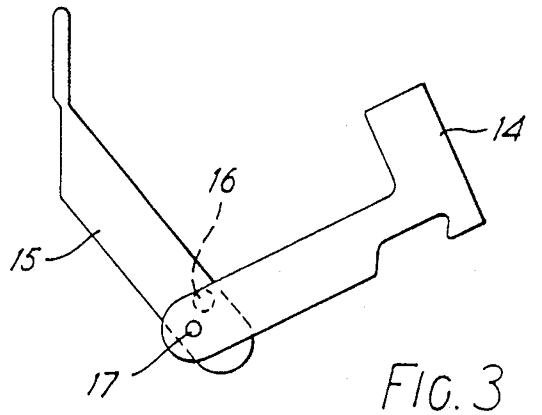
FIG. 3 is a schematic view of the stirrup member and handle of the connector of FIG. 1 in an open configuration.

To connect a cable (connected to the contacts 7 of the socket 2 as aforesaid) to a switch (connected to the contacts 11 of the plug 1 as aforesaid, the latter being bolted to the switch housing by its flange 4 as aforesaid), the socket 2 is angularly orientated with respect to the plug 1 so as to cause the feather 31 to be aligned with the keyway 32, and the socket 2 is slid over the plug 31 as far as a step 33 on the outside of the latter, with the stirrup member 14 and handle 15 in the position shown in FIG. 3. As can be seen the pivot 17 lies below the pivot 16.

Figure 4:
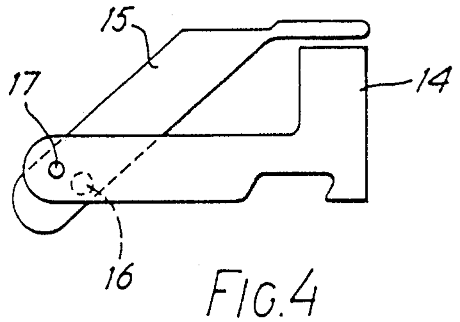
FIG. 4 is a schematic view of the stirrup member and handle of the connector of FIG. 1 in a locked configuration.

The stirrup member 14 is then rotated in the direction of the arrow B about the pivots 17 until the hook-like portions of the stirrup member 14 engage the lugs 18. The handle 15 is then displaced in the sense of the arrow A about the pivots 16. Because of the relative positions of the pivotal axes of the two pairs of pivots 17 and 18, the displacement of the handle 15 will first cause the stirrup member 14 to pull the part 2 towards the part 1 in a direction opposite to the direction of the arrow C. This action compresses the "O" ring 19. When an over-centre position is reached the handle will allow the part 2 to move away from the part 1 in the direction of the arrow C. This will in fact occur through the resilience of the "O" ring 19. The movement of the handle is halted when the handle abuts the outer surface of the part 2. As can be seen in FIG. 4, the axis of the pivot 17 now lies above the axis of the pivot 16 and so the resilient force of the "O" ring 19 acts to turn the handle in a clockwise sense into tighter locking engagement with the stirrup member.

In this position the resilience of the "O" ring (which is still partially under compression) actually acts to lock the handle in a position in which it holds the two parts locked together.

To release the two parts the handle is moved in the opposite sense to the arrow A. At first a degree of force is needed to compress the "O" ring again. However, once the over-centre position is reached the "O" ring actual uses its resilience to assist the release action.

The "O" ring 19 serves two purposes, viz. that of the aforesaid resilient means for cooperation with the over-centre buckle 14–17 for locking the plug 1 and the socket 2 together, and also, together with the "O" ring 22, for sealing the socket 2 against the ingress of moisture.

We claim:

1. A connector for releasably connecting a first apparatus to a second apparatus, the connector comprising:

first and second parts, said parts being arranged for slidable interengagement along a common axis, separate resilient means located between the first and second parts acting in a sense to urge the parts apart, engagement means on the second part, a handle pivotally supported on the first part for pivotal movement about a second axis extending generally perpendicular to the common axis, a stirrup member pivotally supported on the handle for pivotal movement about a third axis lying spaced from but extending generally parallel to the second axis, said stirrup means being arranged to engage the engagement means with the handle in an open state, the third axis lying to one side of a plane extending parallel to the first axis and containing the second axis, while with the handle in a closed state the third axis lies to the other side of the said plane, thereby causing progressive pivotal movement of the handle from the open to the closed state in a first sense about the second bar axis initially drawing said two parts together and then allowing limited movement of said parts apart under the force of the resilient means so that said resilient means will urge said handle in said first sense.

2. A connector according to claim 1 wherein the handle is of sufficient length and its locus about the second axis is such that the movement of said handle in said one sense is inhibited when said handle abuts said second part.

3. A connector according to claim 1, wherein said resilient means comprises an annular resilient member housed in said second part.

4. A connector according to claim 3, wherein said annular resilient member is an "O"-ring made of rubber or a synthetic rubber-like material.

5. A connector according to claim 1, wherein said stirrup member has a hook portion arranged to engage said engagement means and wherein said engagement means comprises a lug.

6. A connector according to claim 1 including, a first non-conductive carrier member located within the first part, first resilient means for locking the first carrier member to the first part in a snap action mode, and a first contact mounted on said carrier member.

7. A connector according to claim 6 including a second non-conductive carrier member located within the second part, second resilient means for locking the second carrier member to the second part in a snap-action mode and, a second contact arranged to matingly engage with the first contact, mounted on said second non-conductive carrier member.

8. A connector according to claim 1, wherein one of said parts is in the form of a plug and the other one in the form of a socket, said plug and socket being adapted for insertion of the former in the latter in predetermined angular relationship therebetween.

* * * * *